US010862602B2

(12) United States Patent
Matsunaga et al.

(10) Patent No.: US 10,862,602 B2
(45) Date of Patent: Dec. 8, 2020

(54) TIME SYNCHRONIZATION METHOD, SENSOR DATA ACQUISITION TERMINAL, AND SENSOR NETWORK SYSTEM

(71) Applicant: NIPPON TELEGRAPH AND TELEPHONE CORPORATION, Tokyo (JP)

(72) Inventors: Kenichi Matsunaga, Tokyo (JP); Shoichi Oshima, Tokyo (JP); Toshihiko Kondo, Tokyo (JP); Ahmed Musa, Tokyo (JP); Hiroki Morimura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/092,730

(22) PCT Filed: Apr. 12, 2017

(86) PCT No.: PCT/JP2017/014934
§ 371 (c)(1),
(2) Date: Oct. 10, 2018

(87) PCT Pub. No.: WO2017/179608
PCT Pub. Date: Oct. 19, 2017

(65) Prior Publication Data
US 2019/0132071 A1 May 2, 2019

(30) Foreign Application Priority Data
Apr. 14, 2016 (JP) ................................. 2016-080820

(51) Int. Cl.
*H04J 3/06* (2006.01)
*G08C 17/02* (2006.01)
(Continued)

(52) U.S. Cl.
CPC ............ *H04J 3/0667* (2013.01); *G08C 15/06* (2013.01); *G08C 17/00* (2013.01); *G08C 17/02* (2013.01);
(Continued)

(58) Field of Classification Search
CPC ....... H04J 3/0667; G08C 17/02; G08C 15/06; G08C 17/00; H04Q 9/04; H04Q 9/00;
(Continued)

(56) References Cited

U.S. PATENT DOCUMENTS 9,693,325 B1 *   6/2017 Park ......................... H04W 4/70
2009/0222589 A1 * 9/2009 Kirsch ................... H04J 3/0697
709/248
(Continued)

FOREIGN PATENT DOCUMENTS

CN    101009546 A    8/2007
CN    101043317 A    9/2007
(Continued)

OTHER PUBLICATIONS

Sami Rollins, "Time Synchronization", Jan. 15, 2008, pp. 1-4. (Year: 2008) (Year: 2008).*
(Continued)

*Primary Examiner* — Andrew Lai
*Assistant Examiner* — Chuong M Nguyen
(74) *Attorney, Agent, or Firm* — Womble Bond Dickinson (US) LLP (57) ABSTRACT

In a sensor data acquisition terminal (10), an NTP back-end processing unit (12) synchronizes a terminal timing with a parent terminal timing by exchanging NTP packets for time synchronization with a parent terminal (20) based on NTP, and a protocol conversion unit (13) converts an NTP packet, which is output from the NTP back-end processing unit (12) and will be transmitted to the parent terminal (20), to a
(Continued)

TPSN packet based on TPSN, outputs the TPSN packet to a wireless processing unit (14), converts a TPSN packet from the parent terminal (20), which is output from the wireless processing unit (14), to an NTP packet, and outputs the NTP packet to the NTP back-end processing unit (12).

12 Claims, 8 Drawing Sheets

(51) Int. Cl.
*H04Q 9/04* (2006.01)
*G08C 15/06* (2006.01)
*G08C 17/00* (2006.01)
*H04L 29/08* (2006.01)
*H04L 29/06* (2006.01)
*H04W 56/00* (2009.01)
*H04W 4/70* (2018.01)

(52) U.S. Cl.
CPC ............ *H04L 67/12* (2013.01); *H04L 69/08* (2013.01); *H04L 69/18* (2013.01); *H04L 69/28* (2013.01); *H04Q 9/04* (2013.01); *H04W 56/002* (2013.01); *H04W 4/70* (2018.02)

(58) Field of Classification Search
CPC ...... H04W 56/002; H04W 4/70; H04L 69/28; H04L 69/18; H04L 69/08; H04L 67/12
See application file for complete search history.

(56) References Cited

U.S. PATENT DOCUMENTS

| | | | | |
|---|---|---|---|---|
| 2009/0252087 A1* | 10/2009 | Jiang | ................. | H04L 67/125 370/328 |
| 2010/0086091 A1* | 4/2010 | Park | ................. | H04J 3/0667 375/356 |
| 2014/0355628 A1 | 12/2014 | Akhlaq et al. | | |

FOREIGN PATENT DOCUMENTS

| | | |
|---|---|---|
| CN | 101523829 A | 9/2009 |
| CN | 102710410 A | 10/2012 |
| CN | 103546868 A | 1/2014 |
| CN | 103828449 A | 5/2014 |
| CN | 104053223 A | 9/2014 |
| CN | 104519563 A | 4/2015 |
| JP | 2004-274558 A | 9/2004 |
| JP | 2011-188644 A | 9/2011 |
| JP | 2014-202734 A | 10/2014 |

OTHER PUBLICATIONS

Sami Rollins, "Time Synchronization", Jan. 15, 2008, pp. 1-4. (Year: 2008).*
"Timing-sync Protocol for Sensor Networks", "Proceedings of the 1st international conference on Embedded networked sensor systems", pp. 138-149, Sensys '03 The First ACM Conference on Embedded Networked Sensor Systems, Los Angeles, CA, USA—Nov. 5-7, 2003.
"International Search Report," PCT/JP2017/014934 (dated Jul. 11, 2017).
Written Opinion received for PCT Patent Application No. PCT/JP2017/014934, dated Jul. 11, 2017, 7 pages (4 pages of English Translation and 3 pages of Original Document).
International Preliminary Report on Patentability received for PCT Patent Application No. PCT/JP2017/014934, dated Oct. 25, 2018, 10 pages (6 pages of English Translation and 4 pages of Original Document).
Supplementary European Search Report and Written Opinion received for EP Patent Application No. 17782421.6, dated Aug. 27, 2019, 7 pages.
University of Tokyo, "Survey Trend of Time synchronization Techniques in Wireless Sensor Networks", Morikawa Laboratory Technical Research Report, No. 2008001, Apr. 24, 2008, 18 pages (with English Translation).
Office Action received for Chinese Patent Application No. 201780023506.6, dated Jun. 9, 2020, 16 pages (8 pages of English Translation and 8 pages of Office Action).

* cited by examiner

| NAME | EXPECTED ENVIRONMENTS | PRINCIPLE | ACCURACY | EXISTING TECHNIQUES | DRAWBACKS |
|---|---|---|---|---|---|
| NTP | REMOTE/WIRED/BIDIRECTIONAL COMMUNICATION | TIMESTAMP EXCHANGE | △ | ◎ (OOS, CHARGED OS ATTACHED) | IP SUPPORT REQUIRED → LARGE OVERHEAD |
| RBS | NEAR FIELD/INTER-CHILD-DEVICE COMMUNICATION | TIMESTAMP OF BROADCAST PACKET | △ | △ (SW CUSTOMIZED INSTALLATION) | CHILD DEVICES INCREASE → COMMUNICATION AMOUNT INCREASES |
| FPST | NEAR FIELD/UNIDIRECTIONAL COMMUNICATION | TIMESTAMP IN WIRELESS MAC LAYER | ○ | × (HW CUSTOMIZED INSTALLATION) | MAC LAYER OPERATION REQUIRED → WiFi, BT UNUSABLE |
| TPSN | NEAR FIELD/TREE TYPE/ BIDIRECTIONAL COMMUNICATION | TIMESTAMP EXCHANGE | ○ | △ (SW CUSTOMIZED INSTALLATION) | BACK-END CUSTOMIZED INSTALLATION REQUIRED |
| GPS | OUTDOOR/UNIDIRECTIONAL COMMUNICATION | TIMESTAMP OF GPS | ◎ | ○ (CORRESPONDING HW COMMERCIALLY AVAILABLE HW) | UNUSABLE INDOORS, LARGE POWER CONSUMPTION |
| NITZ | 3G/4G COMMUNICATION | SYNCHRONIZATION WITH BASE STATION | ○ | ○ (CORRESPONDING HW COMMERCIALLY AVAILABLE HW) | SIM (3G/4G) REQUIRED, LARGE POWER CONSUMPTION |

( ◎ : Excellent, ○ : Good, △ : Average, × : Bad )

TIME SYNCHRONIZATION METHOD, SENSOR DATA ACQUISITION TERMINAL, AND SENSOR NETWORK SYSTEM

TECHNICAL FIELD

The present invention relates to a time synchronization technology for synchronizing the timings of sensor data acquisition terminals each embedding a plurality of wireless sensor terminals.

BACKGROUND ART

Figure 6:
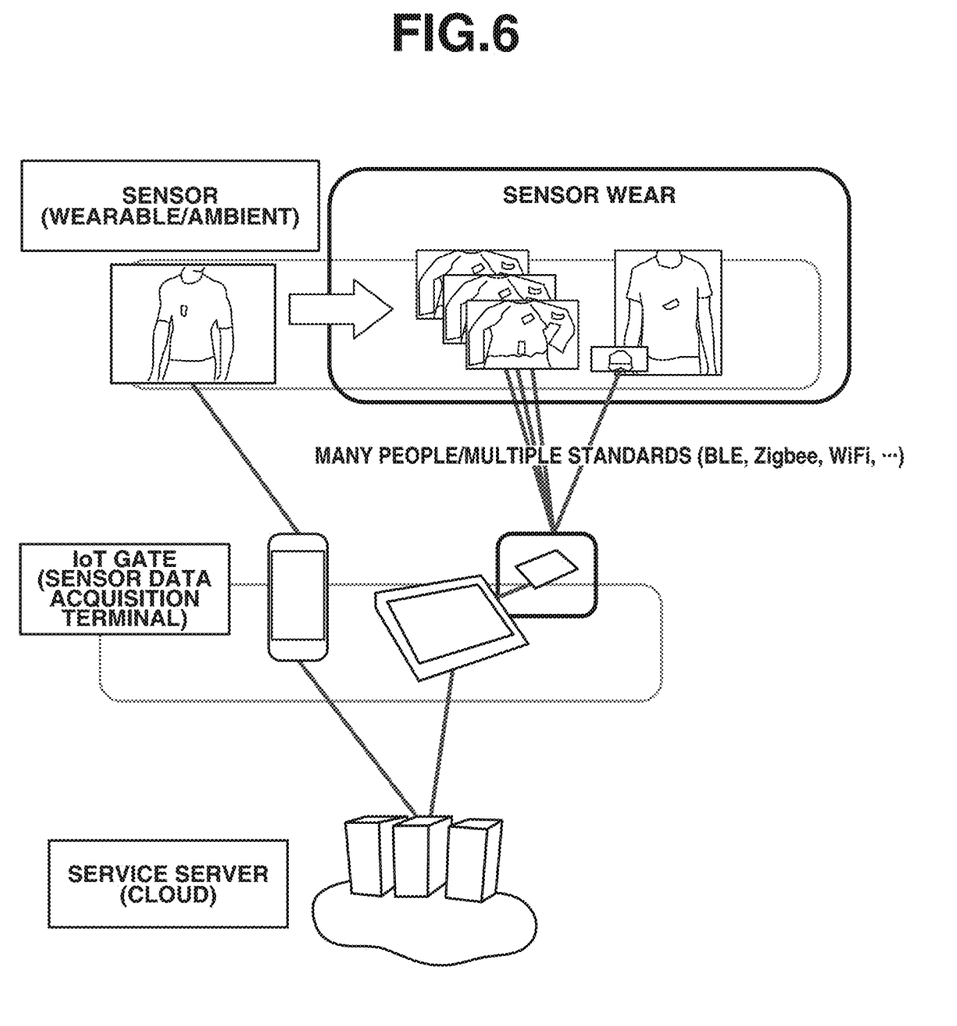
FIG. 6 shows a configuration example of a sensor network used by IoT.

In the society experiencing adoption of the Internet of Things (IoT) in which all things are connected to the Internet, various kinds of sensors are connected to a sensor network as shown in FIG. 6, to collect various and large amount of data, and are expected to obtain information useful to humans by analyzing the data. In such a society, a terminal embedding a wireless sensor terminal is needed to handle various use cases and needs. This may cause operational problems when currently mainstream smartphones are simply being used.

Figure 7:
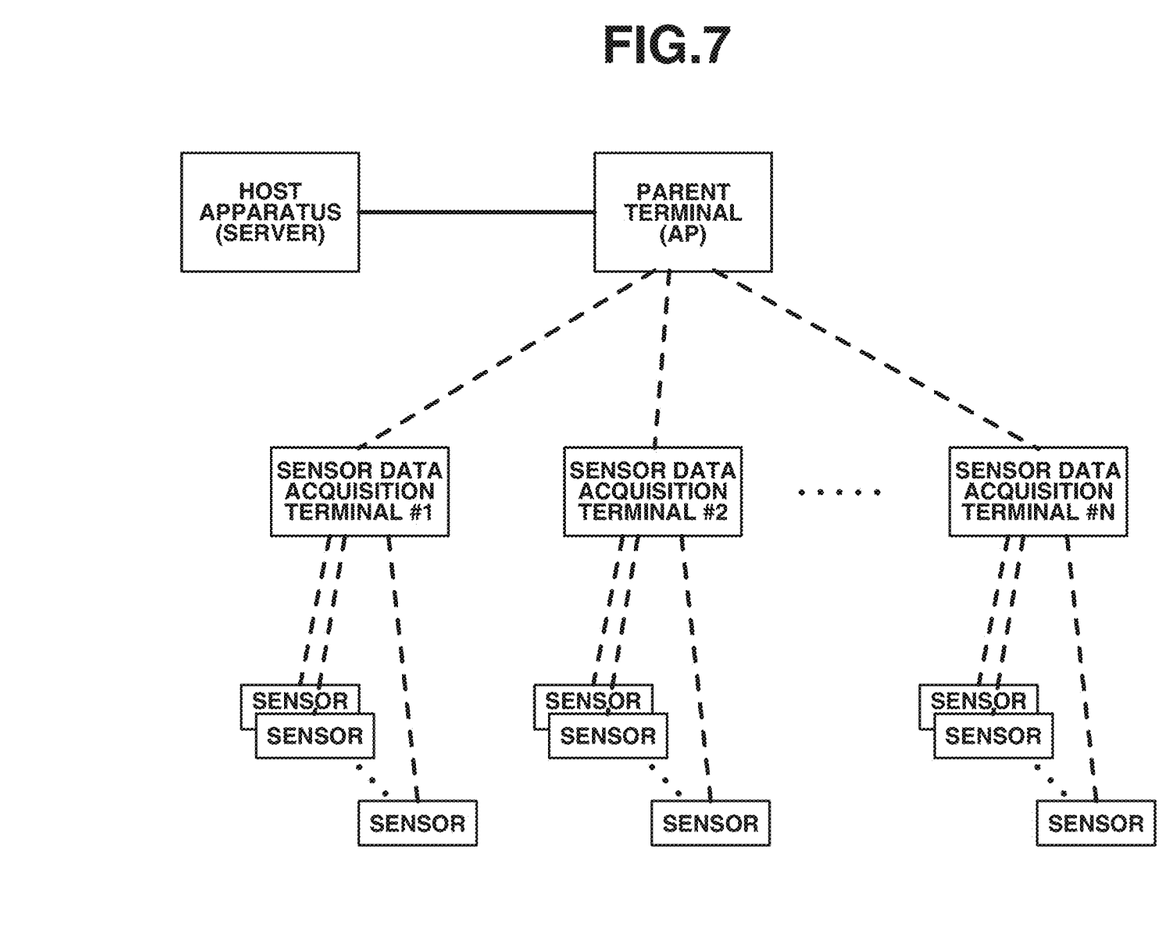
FIG. 7 shows a configuration example of a general sensor network.

In particular, it is difficult to simultaneously connect a large number of smartphones. As a counter-measure for this problem, the number of connectable smartphones are increased by using a tree-type network configuration of sensor data acquisition terminals, like a sensor network shown in FIG. 7. In this method, however, the following two problems arise when a time synchronization method is not installed on each sensor data acquisition terminal.

Figure 8:
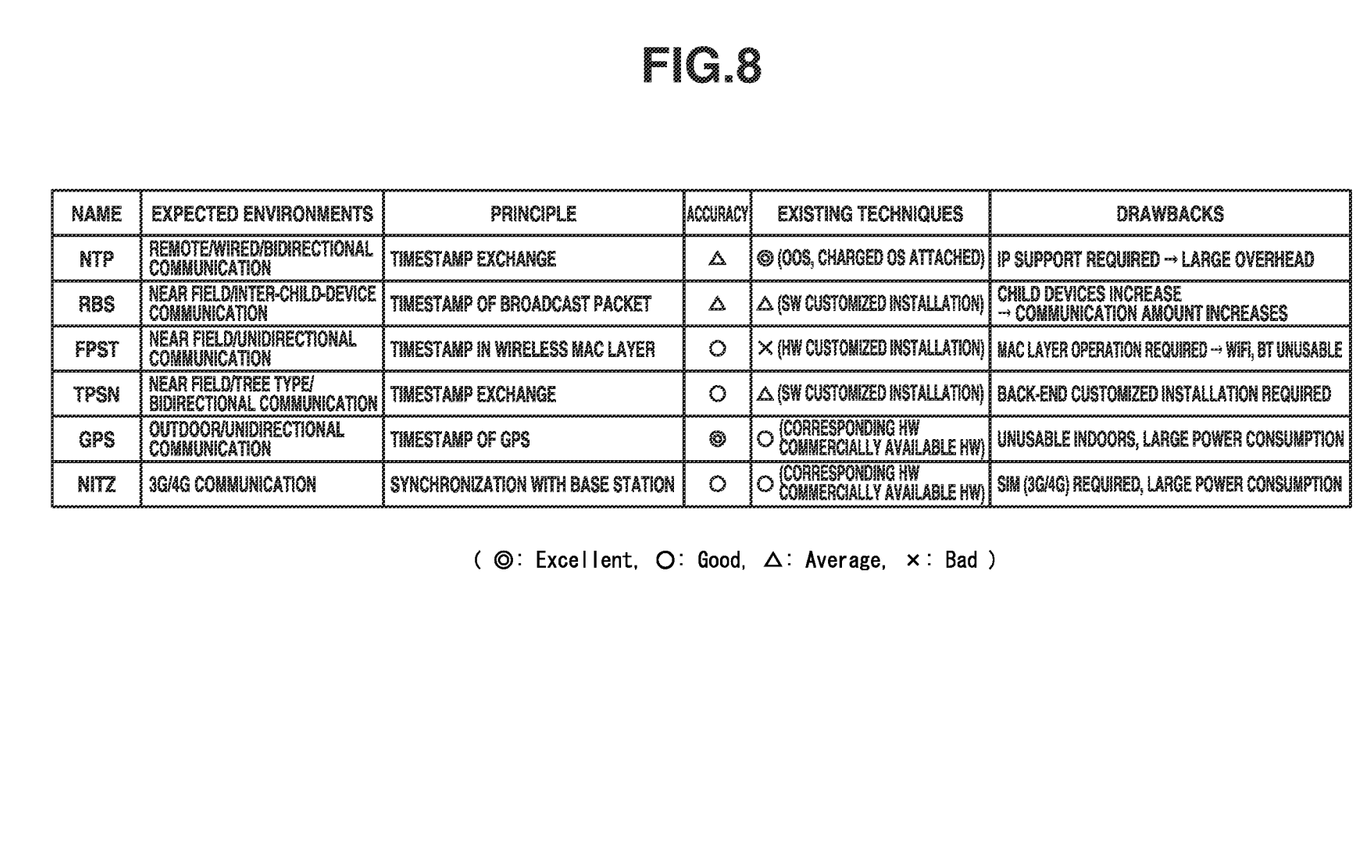
FIG. 8 shows the survey of the conventional time synchronization technology.

The first problem being unable to arrange sensor data in time series. This is because the sensor data obtained by the individual sensor data acquisition terminals have no unified time reference. The second problem is that packets collide against each other or time is being wasted on channels because the individual sensor data acquisition terminals transmit sensor data to a parent terminal at their local timings. As shown in FIG. 8, various time synchronization methods have been proposed for the sensor networks as described above.

However, the conventional time synchronization technologies as described above have both advantages and disadvantages in their application ranges, and cannot cover and satisfy all cases by using a single protocol. In addition, wireless standards and hardware corresponding to protocols such as Global Positioning System (GPS), Network Identity and Time Zone (NITZ), and Flooding Time Synchronization Protocol (FTSP) are limited. Thus, these protocols cannot be handled especially on low-power wireless standards such as Zigbee® and Wi-SUN® excel in handling the present-day sensing data.

RELATED ART LITERATURE

Non-Patent Literature

Non-Patent Literature 1: Makoto Suzuki et al., "Musen Sensor Network ni okeru jikoku douki gijyutsu no kenkyu doukou" [Survey Trend of Time synchronization Techniques in Wireless Sensor Networks], Research Center for Advanced Science and Technology, The University of Tokyo, Morikawa Laboratory Technical Research Report, No. 2008001, Apr. 24, 2008 (in Japanese)

Non-Patent Literature 2: "Timing-sync Protocol for Sensor Networks", "Proceedings of the 1st international conference on Embedded networked sensor systems", pp. 138-149, Sensys '03 The First ACM Conference on Embedded Networked Sensor Systems, Los Angeles, Calif., USA—Nov. 5-7, 2003

DISCLOSURE OF INVENTION

Problem to be Solved by the Invention

The present invention has been made to solve the problems as described above, and has as its object to provide a time synchronization technology in various wireless standards used to transmit sensor data capable of accurately synchronizing the timings of sensor data acquisition terminals.

Means of Solution to the Problem

In order to achieve the above object, a time synchronization method according to the present invention is a time synchronization method for a plurality of terminals wirelessly connected to a parent terminal, and synchronizes a terminal timing of the terminal with a parent terminal timing of the parent terminal, including a wireless processing step of exchanging various packets with the parent terminal by wireless communication, a back-end processing step of synchronizing the terminal timing with the parent terminal timing by exchanging NTP packets for time synchronization with the parent terminal based on Network Time Protocol (NTP), and a protocol conversion step of converting an NTP packet that is output in the back-end processing step and to be transmitted to the parent terminal, to a TPSN packet based on Timing-sync Protocol for Sensor Network (TPSN), outputting the TPSN packet to the wireless processing step, converting a TPSN packet from the parent terminal, which is output in the wireless processing step, to an NTP packet, and outputting the NTP packet to the back-end processing step.

A sensor data acquisition terminal according to the present invention is a sensor data acquisition terminal that collects sensor data detected by a plurality of wireless sensor terminals, and wirelessly transmits the sensor data to a parent terminal, including a wireless processing unit configured to exchange various packets with the parent terminal by wireless communication, a back-end processing unit configured to synchronize a terminal timing of the wireless sensor terminal with a parent terminal timing of the parent terminal by exchanging NTP packets for time synchronization with the parent terminal based on Network Time Protocol (NTP), and a protocol conversion unit configured to convert an NTP packet that is output from the back-end processing unit and to be transmitted to the parent terminal, to a TPSN packet based on Timing-sync Protocol for Sensor Network (TPSN), output the TPSN packet to the wireless processing unit, convert a TPSN packet from the parent terminal, which is output from the wireless processing unit, to an NTP packet, and output the NTP packet to the back-end processing unit.

A sensor network system according to the present invention is a sensor network system including a parent terminal and a plurality of sensor data acquisition terminals that collect sensor data detected by a plurality of wireless sensor terminals and wirelessly transmit the sensor data to the parent terminal, wherein the sensor data acquisition terminal is any sensor data acquisition terminal described above.

Effect of the Invention

The present invention is capable of compensating for the drawback of NTP that is, difficulties in achieving highly accurate time synchronization as NTP being originally established based on an assumption that it is applied to very-remote wired communications. Such a drawback can be compensated by using TPSN, a protocol originally designed for sensor networks, which has a relatively high synchronization accuracy. In particular, TPSN is a protocol similar to NTP, so it is possible to accurately synchronize the timings of the sensor data acquisition terminals by a relatively simple protocol conversion process. Furthermore, NTP and TPSN can be installed independent of wireless standards to be used for sensor networks. This enables smooth transitions when supporting a new wireless standard in the future, or when using another wireless standard.

BEST MODE FOR CARRYING OUT THE INVENTION

An embodiment of the present invention will be explained below with reference to the accompanying drawings.

[Sensor Network System]

First, a sensor network system 1 according to this embodiment will be explained with reference to FIG. 1.

Figure 1:
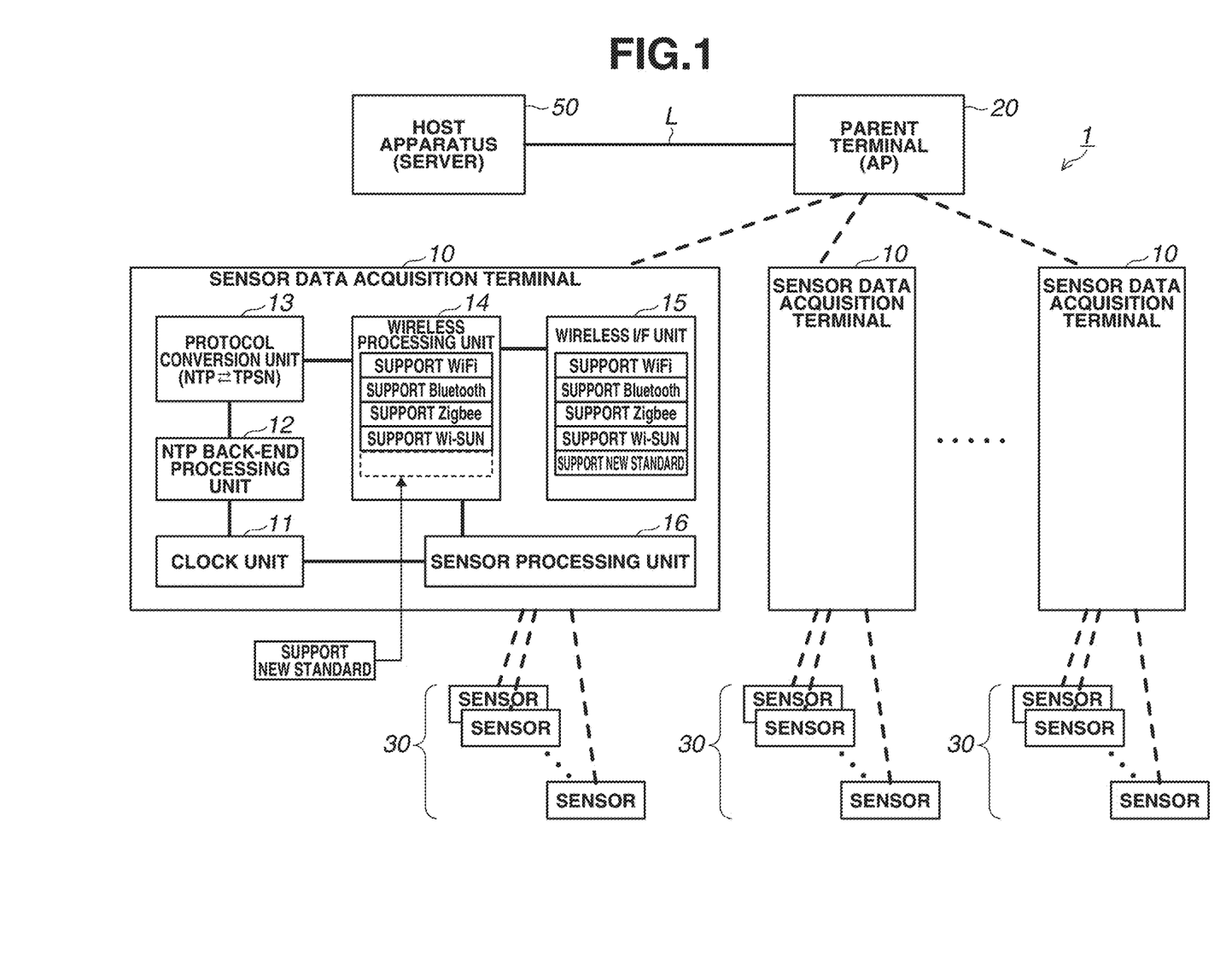
FIG. 1 is a block diagram showing the configuration of a sensor network system according to an embodiment.

As shown in FIG. 1, the sensor network system 1 includes a plurality of sensor data acquisition terminals 10 for wirelessly connecting various kinds of wireless sensor terminals 30, and a parent terminal 20 wirelessly connected to the sensor data acquisition terminals 10.

The wireless sensor terminal 30 is a wireless sensor terminal such as a wearable sensor or sensor wear, and has a function of detecting sensor data such as surrounding environment of humans or biological data, and wirelessly transmitting such sensor data.

The sensor data acquisition terminal (terminal) 10 is, as a whole, a wireless relay terminal, for example, a fixed wireless relay terminal like a Wi-Fi router or a mobile wireless relay terminal like a smartphone. The sensor data acquisition terminal 10 receives sensor data that is wirelessly transmitted from the wireless sensor terminal 30, integrates the sensor data with sensor data from other wireless sensor terminals 30, and wirelessly transmits the integrated sensor data to the parent terminal 20.

The parent terminal 20 is, as a whole, a wireless access point (AP), which receives sensor data from each sensor data acquisition terminal 10, and transfers the sensor data to a host apparatus 50 via a communication line L.

The host apparatus 50 is, as a whole, a server apparatus, which generates a series of time-series data by accumulating sensor data transferred from the parent terminal 20, and provides the generated data to the user.

Of the time synchronization technology shown in FIG. 8, NTP (Network Time Protocol: IETF RFC5905, RFC2030) is a protocol for computers used to synchronize with each other on the Internet. On the Internet, a packet transfer time can be from about a few ms to a few hundred ms due to the transfer waiting time occurred in a router, that is, a delay depends on the traffic as well. To reduce the influence caused by such fluctuation of transfer time, NTP facilitates time synchronization by 2-way handshake. NTP has a hierarchical structure, and the uppermost server has an accurate standard time. A lower host adjusts the timing by referring to the timing of the upper server. NTP can inquire of a plurality of servers about the time, and this improves the flexibility and accuracy of the time synchronization.

On the other hand, TPSN (Timing-sync Protocol for Sensor Network: non-patent literature 2) first constructs a spanning tree by using a node which is a synchronization reference as a root. Then, a parent node and child node of the constructed spanning tree perform synchronization by using a timestamp by 2-way handshake like NTP. By recording the timestamp when exchanging data by a MAC layer that is, when performing transmission and reception, time synchronization errors caused by send, access, and receive can be reduced.

As described above, both NTP and TPSN are protocols that implement time synchronization by exchanging timestamps, and thus they have similarities in methods. Additionally, NTP has many years of practical experience on PCs such as Windows PCs and Linux® PCs, and has software resources such as open-source software. However, NTP is originally established on an assumption that it is applied to very-remote wired communications. Thus, high-accuracy time synchronization is difficult. On the other hand, TPSN is a protocol originally designed for sensor networks, and hence has a relatively high accuracy. Since TPSN is a newer protocol, full customization of software is necessary when installing TPSN, and this creates problems in development and maintenance of such software.

The present invention is focusing on the features of NTP and TPSN as described above, and has an arrangement in which a protocol conversion unit for converting NTP to TPSN and vice versa is formed in the sensor data acquisition terminal 10, a time synchronization process is executed based on NTP inside the sensor data acquisition terminal 10, and wireless transmission is performed based on TPSN outside the sensor data acquisition terminal 10.

[Sensor Data Acquisition Terminal]

The configuration of the sensor data acquisition terminal 10 according to this embodiment will be explained below with reference to FIG. 1.

The sensor data acquisition terminal 10 includes a clock unit 11, an NTP back-end processing unit 12, a protocol conversion unit 13, a wireless processing unit 14, a wireless I/F unit 15, and a sensor processing unit 16, as main functional units. Of these functional units, each of the NTP back-end processing unit 12 and protocol conversion unit 13 is implemented by an arithmetic processor in which a CPU and program cooperate with each other.

The clock unit 11 is a clock circuit including a real-time clock (RTC) IC or quartz oscillator, and has a function of counting timings to be used in a processing operation of the sensor data acquisition terminal 10, such as a timestamp to be given to sensor data from the wireless sensor terminal 30.

The NTP back-end processing unit 12 has a function of executing a time synchronization process by exchanging NTP packets for time synchronization with the parent terminal 20 based on NTP, and setting the timing of the clock unit 11 based on the processing result.

The protocol conversion unit 13 has a function of converting the format of an NTP packet from the NTP back-end processing unit 12 to that of a TPSN packet and outputting the TPSN packet to the wireless processing unit 14, and a function of converting the format of a TPSN packet from the wireless processing unit 14 to that of an NTP packet, and outputting the NTP packet to the NTP back-end processing unit 12.

The wireless processing unit 14 is firmware corresponding to various wireless standards, and has a function of exchanging sensor-data packets and time synchronization TPSN packets with the parent terminal 20 via the wireless I/F unit 15, and a function of receiving sensor-data packets transmitted from the wireless sensor terminal 30 via the wireless I/F unit 15.

The wireless processing unit 14 includes modules of firmware including hardware for performing signal processing corresponding to various wireless standards such as WiFi, Bluetooth®, Zigbee, and Wi-SUN, and software for performing a modulation process, and controls the wireless I/F unit 15 based on the firmware of a wireless standard preselected by setting from these modules, thereby performing wireless communication with the parent terminal 20 or wireless sensor terminal 30.

The wireless I/F unit 15 is hardware corresponding to various wireless standards, and has a function of transmitting an output packet from the wireless processing unit 14 to the parent terminal 20 based on the wireless standard, a function of outputting a packet received from the parent terminal 20 based on the wireless standard to the wireless processing unit 14, and a function of receiving a sensor-data packet transmitted from the wireless sensor terminal 30.

The wireless I/F unit 15 includes hardware corresponding to various wireless standards such as WiFi, Bluetooth®, Zigbee, and Wi-SUN, and wirelessly communicates with the parent terminal 20 or wireless sensor terminal 30 based on the hardware of a wireless standard selected from these wireless standards by the firmware of the wireless processing unit 14.

The sensor processing unit 16 has a function of wirelessly connecting to the wireless sensor terminals 30 via the wireless processing unit 14 and wireless I/F unit 15, collecting sensor data detected by the wireless sensor terminals 30, and temporarily storing the sensor data by giving them timestamps of the timings counted by the clock unit 11, and a function of generating a packet by integrating these sensor data, and outputting the packet to the wireless processing unit 14.

[Operation of this Embodiment]

Next, the time synchronization operation of the sensor network system 1 and sensor data acquisition terminal 10 according to this embodiment will be explained.

In this explanation, it is assumed that the parent terminal 20 is based on a known time synchronization technology such as NTP, and synchronized with the standard timing of the host apparatus 50 or the like.

First, the NTP back-end processing unit 12 of the sensor data acquisition terminal 10 periodically generates an NTP packet indicating a time synchronization request and addressed to the parent terminal 20, and outputs the NTP packet to the protocol conversion unit 13.

The protocol conversion unit 13 converts the NTP packet from the NTP back-end processing unit 12 to a TPSN packet, and outputs the TPSN packet to the wireless processing unit 14.

The wireless processing unit 14 wirelessly transmits the TPSN packet from the protocol conversion unit 13 to the parent terminal 20 by controlling the hardware of the wireless I/F unit 15 based on firmware corresponding to a preselected wireless standard.

In accordance with the TPSN packet indicating the time synchronization request from the sensor data acquisition terminal 10, the parent terminal 20 generates a TPSN packet indicating a time synchronization response based on its local timing, and returns this TPSN packet to the sensor data acquisition terminal 10.

The wireless processing unit 14 receives the TPSN packet returned from the parent terminal 20 via the wireless I/F unit 15, and outputs the TPSN packet to the protocol conversion unit 13.

The protocol conversion unit 13 converts the TPSN packet from the wireless processing unit 14 to an NTP packet, and outputs the NTP packet to the NTP back-end processing unit 12.

In accordance with the NTP packet indicating the time synchronization response from the protocol conversion unit 13, the NTP back-end processing unit 12 calculates the time difference from the timing of the parent terminal 20, and corrects the timing of the clock unit 11, thereby synchronizing the timing of the clock unit 11 with that of the parent terminal 20.

In this operation, the NTP back-end processing unit 12 calculates required transfer time in the round path to the parent terminal 20 based on timing information contained in the NTP packet indicating the time synchronization response, the transmission timing of the NTP packet indicating the time synchronization request, and the reception timing of the NTP packet indicating the time synchronization response. Then, the NTP back-end processing unit 12 calculates the time difference between the timings of the parent terminal 20 and clock unit 11 from these required transfer time, calculates a drift indicating a counting rate shift in the clock unit 11, and corrects the timing of the clock unit 11 based on the time difference and the drift.

[Effects of this Embodiment]

In this embodiment as described above, in the sensor data acquisition terminal 10 (the terminal), the NTP back-end processing unit 12 exchanges NTP packets for time synchronization with the parent terminal 20, thereby synchronizing the terminal timing with the parent apparatus timing. The protocol conversion unit 13 converts an NTP packet, which is output from the NTP back-end processing unit 12 and will be transmitted to the parent terminal 20, to a TPSN packet based on TPSN, and outputs the TPSN packet to the wireless processing unit 14. In addition, the protocol conversion unit 13 converts a TPSN packet from the parent terminal 20, which is output from the wireless processing unit 14, to an NTP packet, and outputs the NTP packet to the NTP back-end processing unit 12.

Accordingly, the drawback of NTP that is, difficulties in achieving highly accurate time synchronization as NTP being originally established on the assumption that NTP is to be used for very-remote wired communication, can be compensated for by TPSN. As TPSN is a protocol originally designed for sensor networks and hence has a relatively high synchronization accuracy. In particular, since TPSN is a protocol similar to NTP, it is possible to accurately synchronize the timings of the sensor data acquisition terminals 10 by a relatively simple protocol conversion process.

Figure 2:
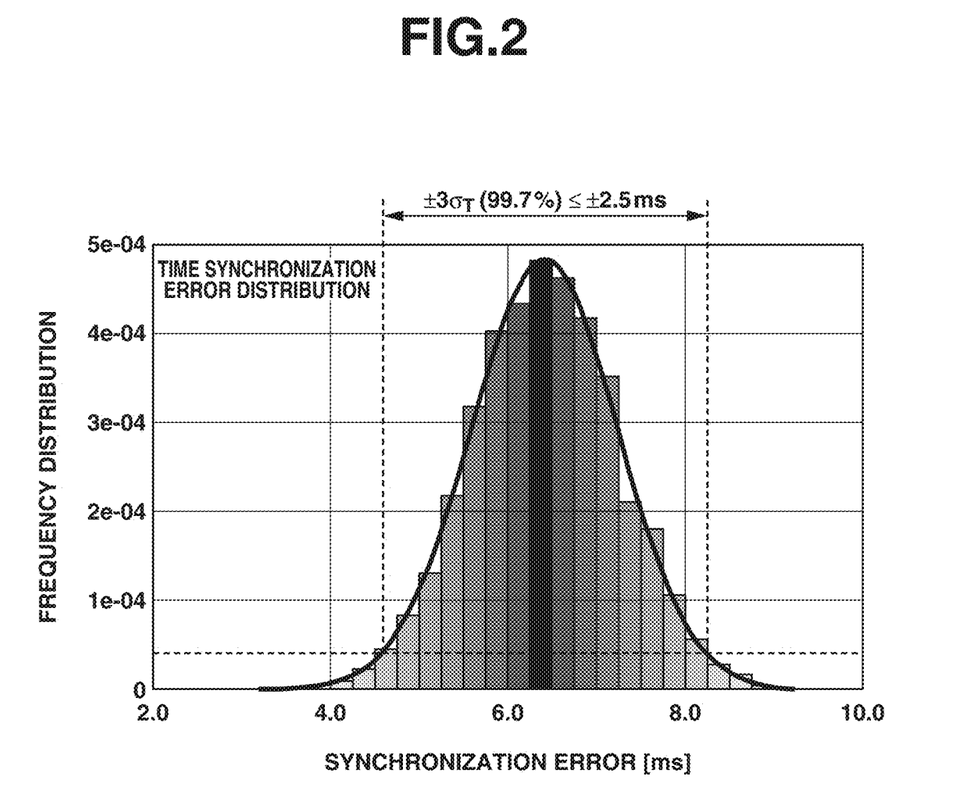
FIG. 2 is a graph showing the result of an experiment on synchronized timings according to the embodiment.

In the result of an experiment on synchronized timings shown in FIG. 2, the abscissa indicates synchronization errors [ms], and the ordinate indicates a frequency distribution in which each synchronization error has occurred. In FIG. 2, the synchronization error frequency distribution is almost equal to a normal distribution, and the range of 3a including 99.7% of the whole distribution is smaller than 4 ms. A synchronization error with respect to a frame rate of 30 fps (33 ms/frame) of a general moving image is ±2.5 ms. This shows that this synchronized timing error of the present invention makes it possible to transmit high-quality sensor data even when the data is moving image data.

Figure 3:
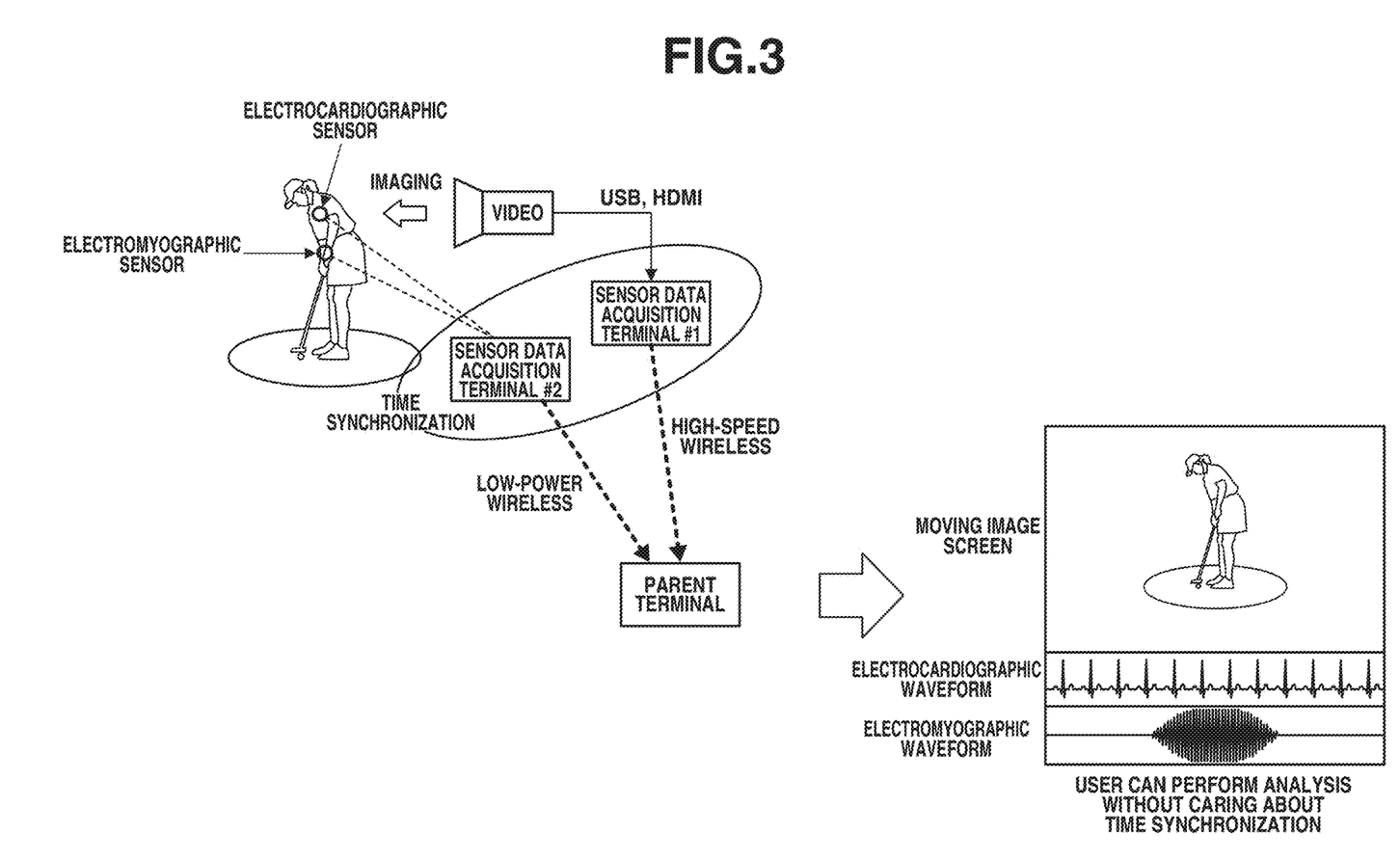
FIG. 3 shows an application example of the sensor network system according to the embodiment.

FIG. 3 shows a case in which moving image data obtained by capturing a golf swing form, the electrocardiographic waveform, and electromyographic waveform of the user are detected as sensor data during golf practice.

Moving image data captured by a video camera are collected by a sensor data acquisition terminal #1 and transferred to a parent terminal using a high-speed wireless standard. The electrocardiographic waveform and electromyographic waveform detected by a wearable electrocardiographic sensor and wearable electromyographic sensor are collected by a sensor data acquisition terminal #2 and transferred to the parent terminal using a low-power wireless standard.

In this case, the terminal timings of the sensor data acquisition terminals #1 and #2 are synchronized with the parent apparatus timing of the parent terminal. Therefore, it is possible to play back the moving image data, electrocardiographic waveform, and electromyographic waveform transmitted from the sensor data acquisition terminals #1 and #2 by easily synchronizing them.

Accordingly, the user can analyze the golf swing form without caring about the time synchronization of the moving image of the swing form and the user's electrocardiographic waveform and electromyographic waveform.

Figure 4:
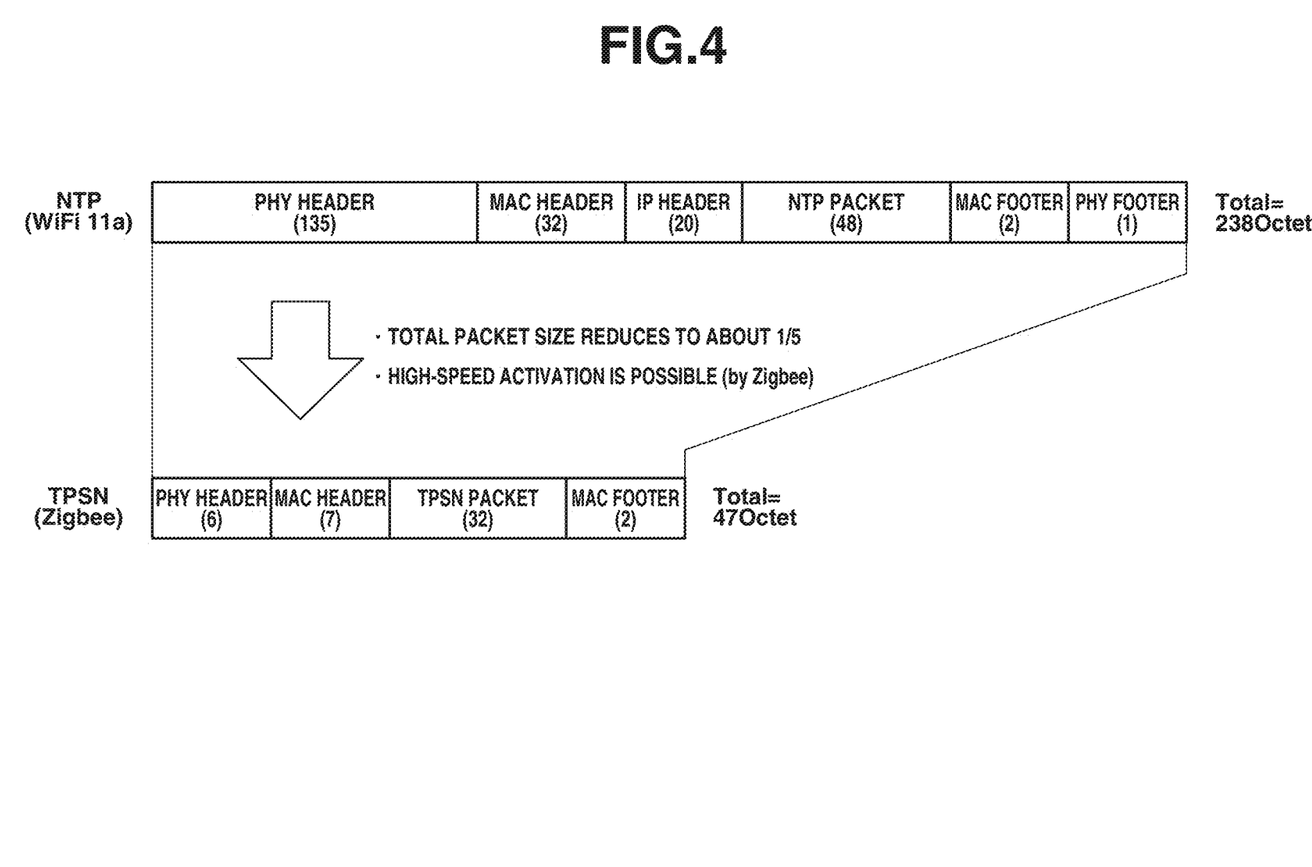
FIG. 4 is a view for explaining time synchronization packets.

Also, the packet size of a time synchronization packet for use in NTP or TPSN is very small. As shown in FIG. 4, when transmitting a general NTP packet by WiFi (IEEE 802.11a), headers PHY, MC, and IP are added to the NTP packet, so the total packet size is 238 Octet. On the other hand, when transmitting the TPSN packet of the present invention by Zigbee, only headers PHY and MAC are added to the TPSN packet, so the total packet size is 47 Octet, i.e., the packet size can be reduced to about ⅕. This makes low-power time synchronization possible.

Furthermore, NTP and TPSN can be installed independently of wireless standards to be used for sensor networks. This enables smooth transitions when supporting a new wireless standard in the future, or when using another wireless standard. In particular, NTP has many years of practical experience on PCs such as Windows PCs and Linux® PCs, and has software resources such as open-source software, so the number of man-hours for development can be significantly reduced.

In this embodiment, the wireless processing unit 14 may also have modules of firmware corresponding to a plurality of different wireless standards, and wirelessly communicate with the parent terminal 20 based on firmware corresponding to a preselected wireless standard.

Since the wireless firmware is moduled, only a relevant portion corresponding to a new wireless standard needs to be newly developed for the wireless firmware which is in any case necessary for remaking every time the specification is changed. This can greatly reduce the number of man-hours for development.

In this embodiment, the wireless processing unit 14 may also select firmware corresponding to a wireless standard matching a communication performance request transmitted from the parent terminal 20. In this case, communication performance requests and wireless standards are associated with each other in advance.

Consequently, it is possible to select WiFi when high-speed communication is required, and select BLE or Zigbee when only low-speed communication is necessary. That is, it is possible to flexibly select a communication standard and perform wireless communication in accordance with a communication performance request designated by the parent terminal 20 or host apparatus 50.

In this embodiment, the wireless processing unit 14 may also select firmware corresponding to a wireless standard having the lowest power consumption, from wireless standards matching a communication performance request. In this case, communication performance requests, wireless standards, and power consumptions are associated with each other beforehand.

Since some of the recent wireless standards are made particularly for low power operation, this method is particularly effective when using such a wireless standard.

In this embodiment, the explanation was made in which the time synchronization method of the present invention is applied, as an example, to the sensor data acquisition terminal 10 used in the sensor network system 1. However, the present invention is not limited to this. The time synchronization method of the present invention is applicable to any wireless network system in the same manner as described above, provided that the terminal timing of each terminal wirelessly connected to a parent terminal is synchronized with the parent apparatus timing of the parent terminal.

In this embodiment, the wireless processing unit 14 may also have modules of firmware corresponding to a plurality of different wireless standards, and wirelessly communicate with the wireless sensor terminal 30 based on firmware corresponding to a wireless standard selected from the wireless standards based on communication performance information obtained from the wireless sensor terminal 30.

Accordingly, an optimum wireless standard can be selected especially when a sensor includes wireless standards having different features, such as high-speed and low-speed wireless standards.

In this embodiment, the wireless processing unit 14 may also wirelessly transmit sensor data to the parent terminal 20, based on a transmission timing unique to the sensor data acquisition terminal 10 designated by the parent terminal 20 and on the synchronized terminal timing.

With this, the present invention is capable of controlling the transmission timing of a packet based on the terminal timings synchronized among the sensor data acquisition terminals 10. Therefore, the present invention is capable of avoiding collision of sensor-data packets to be transmitted to the parent terminal 20, turning off the receiving circuit of the parent terminal 20 when no communication is performed, and as a consequence, implementing the low power capability.

Figure 5:
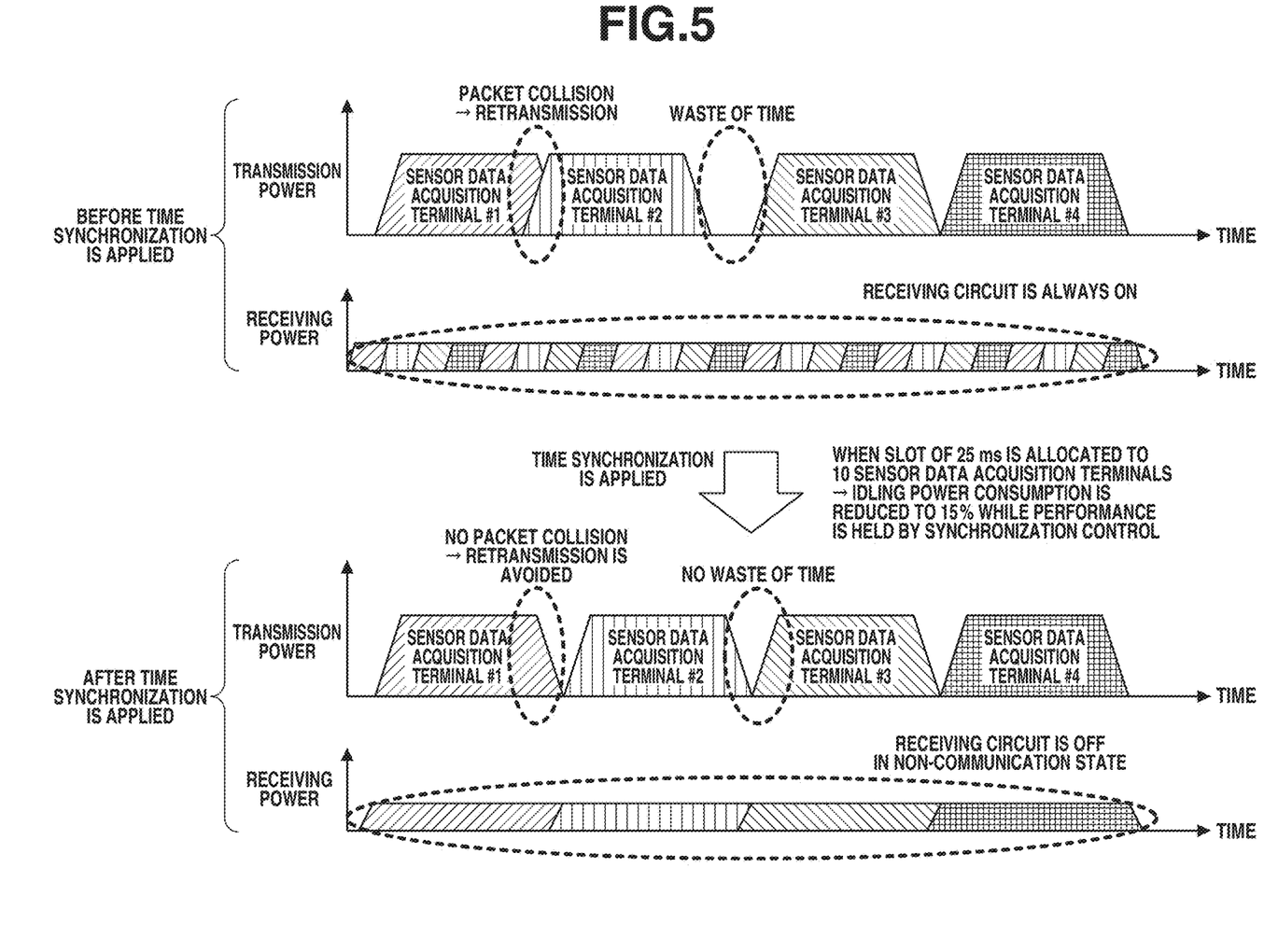
FIG. 5 is a view for explaining transmission timing control.

As shown in FIG. 5, when time synchronization is not applied among the sensor data acquisition terminals 10, there is a possibility that transmission timings overlap with each other and packets collide against each other as in the sensor data acquisition terminals #1 and #2. When packet collision like this occurs, a packet retransmission process is performed, and thus extra transmission power is consumed. Conversely, transmission timings may be separated from each other as in the sensor data acquisition terminals #2 and #3. When a dead time like this occurs, the receiving power is wasted because the receiving power is always consumed.

On the other hand, the transmission timing control of the present invention can perform scheduling such that no packet collision occurs and there is almost no separation between transmission timings. This makes it possible to suppress wasteful power consumption caused by packet retransmission and packet separation. In addition, in accordance with the transmission timings of the sensor data acquisition terminals #1, #2, #3, and #4, power can be supplied only to a corresponding receiving circuit, and thus power supply to a receiving circuit in a non-communication state can be stopped. This can significantly reduce the power consumption in the parent terminal 20. According to an experiment that has been conducted, transmission timing control was so performed as to allocate a time slot of about 25 ms to each of ten sensor data acquisition terminals 10. Consequently, the idling power consumption in the parent terminal 20 was reduced to about 15% of that when no transmission timing control was performed.

NTP packets to be exchanged with the parent terminal 20 are exchanged as they are converted to TPSN packets by the protocol conversion unit 13, so the timing in the MAC layer is applied based on TPSN to the timing of the calculation. Since, therefore, a required transfer time is obtained with higher accuracy than that when using NTP alone, the time difference and drift are calculated with higher accuracy.

In the wireless processing unit 14, firmware corresponding to various wireless standards is moduled. Accordingly, only a relevant portion corresponding to a new wireless standard needs to be newly developed for the wireless firmware which is in any case necessary for remaking every time the specification is changed. This can greatly reduce the number of man-hours for development.

[Extension of Embodiment]

The present invention has been explained above by referring to the embodiments, but the present invention is not limited to the above embodiments. Various changes understandable by those skilled in the art can be made on the arrangements and details of the present invention without departing from the scope of the invention. In addition, these embodiments can be carried out in the form of any arbitrary combination within a range in which they are consistent with each other.

EXPLANATION OF THE REFERENCE NUMERALS AND SIGNS

1 . . . sensor network system, 10 . . . sensor data acquisition terminal, 11 . . . clock unit, 12 . . . NTP back-end processing unit, 13 . . . protocol conversion unit, 14 . . . wireless processing unit, 15 . . . wireless I/F unit, 16 . . . sensor processing unit, 20 . . . parent terminal, 30 . . . wireless sensor terminal, 50 . . . host apparatus, L . . . communication line.

The invention claimed is:

1. A time synchronization method for a plurality of terminals wirelessly connected to a parent terminal, including a back-end processing step of generating a first NTP (Network Time Protocol) packet indicating a time synchronization request that is addressed to the parent terminal, and synchronizing a terminal timing of a terminal with a parent terminal timing of the parent terminal in accordance with a second NTP packet indicating a time synchronization response from the parent terminal based on NTP, said method further comprising:
  a step of converting the first NTP packet indicating the time synchronization request generated in the back-end processing step to a first TPSN (Timing-sync Protocol for Sensor Network) packet indicating the time synchronization request based on TPSN,
  a wireless processing step of transmitting the first TPSN packet indicating the time synchronization request to the parent terminal and receiving a second TPSN packet indicating the time synchronization response that is returned from the parent terminal, by wireless communication; and
  a step of converting the second TPSN packet indicating the time synchronization response received from the parent terminal in the wireless processing step, to the second NTP packet indicating the time synchronization response,
  wherein the back-end processing step includes synchronizing the terminal timing of the terminal with the parent terminal timing of the parent terminal in accordance with the second NTP packet indicating the time synchronization response that is converted from the second TPSN packet indicating the time synchronization response.

2. The time synchronization method according to claim 1, wherein the wireless processing step includes executing firmware corresponding to a plurality of different wireless standards on a module, and includes a step of performing wireless communication with the parent terminal based on firmware corresponding to a wireless standard selected in advance.

3. The time synchronization method according to claim 2, wherein the wireless processing step includes a step of selecting firmware corresponding to a wireless standard matching a communication performance request received from the parent terminal.

4. The time synchronization method according to claim 3, wherein the wireless processing step includes a step of selecting firmware corresponding to a wireless standard having a lowest power consumption, among wireless standards matching the communication performance request.

5. A sensor data acquisition terminal that collects sensor data detected by a plurality of wireless sensor terminals, and wirelessly transmits the sensor data to a parent terminal, comprising:
  a wireless processing unit configured to exchange various packets with the parent terminal by wireless communication;
  a back-end processing unit configured to generate a first NTP (Network Time Protocol) packet indicating a time synchronization request that is addressed to the parent terminal, and synchronize a terminal timing of a wireless sensor terminal with a parent terminal timing of the parent terminal in accordance with a second NTP packet indicating a time synchronization response from the parent terminal based on NTP; and
  a protocol conversion unit configured to convert the first NTP packet indicating a the time synchronization request generated by the back-end processing unit, to a first TPSN (Timing-sync Protocol for Sensor Network) packet indicating the time synchronization request based on TPSN, and output the first TPSN packet indicating the time synchronization request to the wireless processing unit, and convert a second TPSN packet indicating the time synchronization response from the parent terminal, which is output from the wireless processing unit, to the second NTP packet indicating the time synchronization response, and output the second NTP packet indicating the time synchronization response to the back-end processing unit, wherein the wireless processing unit transmits the first TPSN packet indicating the time synchronization request output from the protocol conversion unit, and receives the second TPSN packet indicating the time synchronization response from the parent terminal and outputs the second TPSN packet indicating the time synchronization response to the protocol conversion unit.

6. The sensor data acquisition terminal according to claim 5, wherein the wireless processing unit includes a module of firmware corresponding to a plurality of different wireless standards, and performs wireless communication with the wireless sensor terminals based on firmware corresponding to a wireless standard selected from the wireless standards based on communication performance information obtained from the wireless sensor terminals.

7. The sensor data acquisition terminal according to claim 6, wherein the wireless processing unit wirelessly transmits the sensor data to the parent terminal, based on a transmission timing unique to the sensor data acquisition terminal designated by the parent terminal, and a terminal timing obtained after time synchronization.

8. A sensor network system comprising a parent terminal, and a plurality of sensor data acquisition terminals that collect sensor data detected by a plurality of wireless sensor terminals and wirelessly transmit the sensor data to the parent terminal, wherein the sensor data acquisition terminal is a sensor data acquisition terminal cited in claim 7.

9. A sensor network system comprising a parent terminal, and a plurality of sensor data acquisition terminals that collect sensor data detected by a plurality of wireless sensor terminals and wirelessly transmit the sensor data to the parent terminal, wherein the sensor data acquisition terminal is a sensor data acquisition terminal cited in claim 6.

10. A sensor network system comprising a parent terminal, and a plurality of sensor data acquisition terminals that collect sensor data detected by a plurality of wireless sensor terminals and wirelessly transmit the sensor data to the parent terminal, wherein the sensor data acquisition terminal is a sensor data acquisition terminal cited in claim 5.

11. The sensor data acquisition terminal according to claim 5, wherein the wireless processing unit wirelessly transmits the sensor data to the parent terminal, based on a transmission timing unique to the sensor data acquisition terminal designated by the parent terminal, and a terminal timing obtained after time synchronization.

12. A sensor network system comprising a parent terminal, and a plurality of sensor data acquisition terminals that collect sensor data detected by a plurality of wireless sensor terminals and wirelessly transmit the sensor data to the parent terminal, wherein the sensor data acquisition terminal is a sensor data acquisition terminal cited in claim 11.

* * * * *